United States Patent [19]
Sato et al.

[11] Patent Number: 4,896,553
[45] Date of Patent: Jan. 30, 1990

[54] AUTOMATIC TRANSMISSION

[75] Inventors: Yuji Sato; Hiromi Kono; Akifumi Tanoue; Yoshiyuki Kimura, all of Higashi-matsuyama, Japan

[73] Assignee: Diesel Kiki Co., Ltd., Tokyo, Japan

[21] Appl. No.: 198,825

[22] Filed: May 26, 1988

[30] Foreign Application Priority Data

May 30, 1987 [JP] Japan ................. 62-137316

[51] Int. Cl.⁴ .................................. B60K 20/10
[52] U.S. Cl. ............................ 74/335; 74/336 R
[58] Field of Search ............... 74/335, 336 R, 866

[56] References Cited

U.S. PATENT DOCUMENTS

| | | | |
|---|---|---|---|
| 2,137,961 | 11/1938 | Vorech | 74/33.5 X |
| 2,157,592 | 5/1939 | Casler | 74/335 |
| 3,530,668 | 9/1970 | Siebers et al. | 74/336 R |
| 4,519,484 | 5/1985 | Nagaoka et al. | 74/336 R |
| 4,625,840 | 12/1986 | Kojima et al. | 192/3.58 |
| 4,660,441 | 4/1987 | Young | 74/336 R |
| 4,677,880 | 7/1987 | Hattori et al. | 74/866 |
| 4,733,580 | 3/1988 | Kubo et al. | 74/866 |
| 4,748,863 | 6/1988 | McNinch, Jr. | 74/335 |
| 4,763,545 | 8/1988 | Shibayama et al. | 74/866 X |
| 4,766,774 | 8/1988 | Tamai | 74/335 X |
| 4,784,007 | 11/1988 | Ishida et al. | 74/335 |

FOREIGN PATENT DOCUMENTS 1198501 12/1985 Canada ................. 74/335

Primary Examiner—Leslie A. Braun
Assistant Examiner—Christopher Campbell
Attorney, Agent, or Firm—Wenderoth, Lind & Ponack

[57] ABSTRACT

An automatic transmission includes a fluid-pressure differential cylinder for select operation of the transmission and a fluid-pressure differential cylinder for shift operation of the transmission, each of the differential cylinders being built up into one block and joined with the mating differential cylinder with intake and discharge holes in one block held in communication with intake and discharge holes, respectively, in the other block. A piston rod of each of the differential cylinders has an annular groove and a cylinder block is provided with a locking member engageable with the groove to provide a reference position for the piston rod.

3 Claims, 9 Drawing Sheets

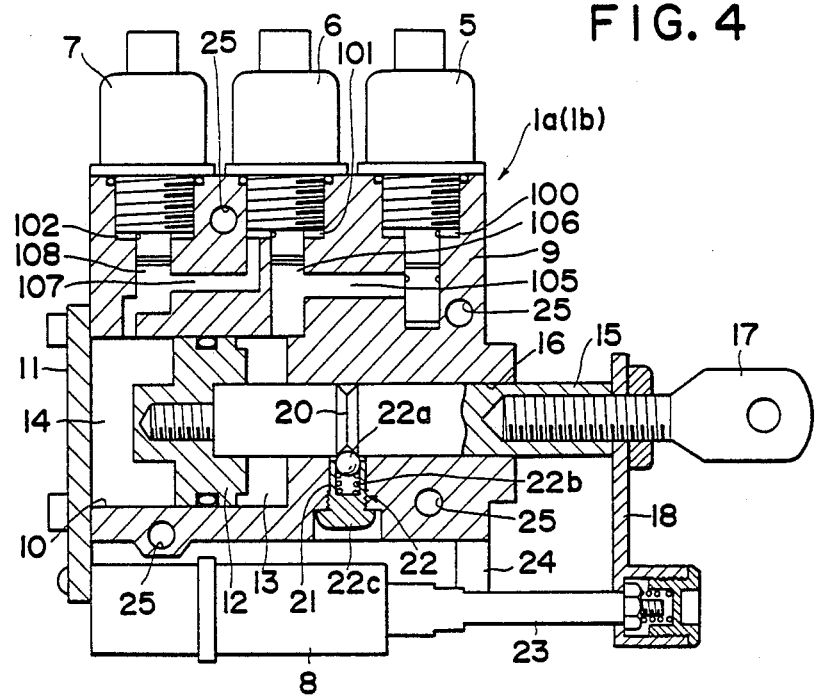
FIG. 4
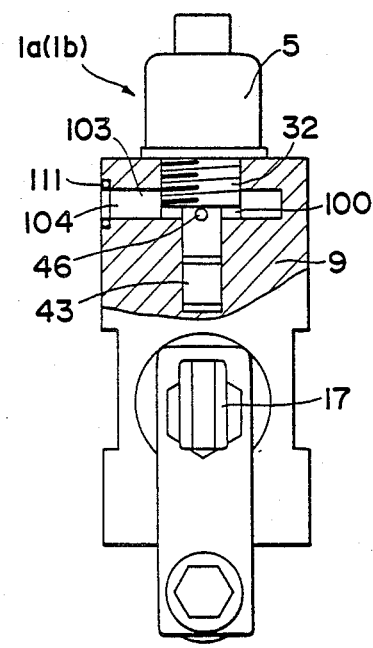
FIG. 5
FIG. 6

AUTOMATIC TRANSMISSION

BACKGROUND OF THE INVENTION

1. Field of the Invention:

The present invention relates to an automatic transmission for use in an automobile.

2. Prior Art:

The performance of an automatic transmission greatly depends on characteristics of fluid-pressure differential cylinders for shift and select operations of the transmission, which cylinders are operative as actuators for displacing a shift lever.

As shown in Japanese Patent Laid-open Publication Nos. 58-146722 and 60-146953, for example, a solenoid-operated valve used to control a fluid-pressure differential cylinder is controlled periodically by a pulse signal while regulating the duty factor of the pulse signal to eventually control the mechanical output of the cylinder.

The pulse signal used in the disclosed valve control has a pulse repetition frequency (e.g. 40 Hz) equal to an on-off response time of the solenoid-operated valve. Thus, the pulse repetition period is equal to 25 m sec. in which instance the minimum pulse width is 6 m sec. or more and hence the pulse duty factor is regulated such that it varies to increase from a minimum value corresponding to this minimum pulse width. Where the pulse signal has a pulse repetition period of 25 m sec. and a minimum width of 6 m sec., each pulse (i.e., a single cycle of on-off operation of the valve) causes the piston to be displaced about 0.1 mm even though the displacement is related to the volume of the cylinder, the pressure of the working fluid, etc. This means that the output of the cylinder can be regulated stepwise by about 0.1 mm at a minimum and hence the resolution of the cylinder output is about 0.1 mm.

When the fluid-pressure cylinder having such resolution of the order of 0.1 mm is used, shift and select positions are determined with an error of about 0.2 mm, thus causing deterioration of the performance of an automatic transmission in which the cylinder is employed.

Further, two such fluid-pressure differential cylinders are disposed separately for effecting shift and select operations, respectively, of the automatic transmission, and they are connected to the corresponding pipings.

Such separate piping requires an increased number of attachments or fittings and hence the piping work is complicated as a whole.

Moreover, the piston of the cylinder is not provided e position, positional adjustment of a piston rod and a shift lever must be carried out by the trial-and-error method.

Such trial-and-error positional adjustment is tedious and time-consuming.

SUMMARY OF THE INVENTION

It is accordingly an object of the present invention to provide an automatic transmission incorporating fluid-pressure differential cylinders for shift and select operations which are capable of determining shift and select positions accurately, thereby improving the accuracy of the transmission as a whole.

Another object of the present invention is to provide an automatic transmission having fluid-pressure differential cylinders for shift and select operations which can be connected to a piping with utmost ease.

A further object of the present invention is to provide an automatic transmission having structural features which enable simple positional adjustment between a drive side constitute by fluid-pressure differential cylinders for shift and select operations, and a driven side constituted by a shift-lever actuator device.

According to a first aspect of the present invention, there is provided an automatic transmission comprising:

a first fluid-pressure differential cylinder for select operation of said automatic transmission;

a second fluid-pressure differential cylinder for shift operation of said automatic transmission;

each of said first and second fluid-pressure differential cylinders including a first chamber and a second chamber having a larger pressure receiving area than said first chamber, said first chamber being connected through a first connecting passage to a hydraulic power supply, said second chamber being connected through a second connecting passage to a tank, said first and second chambers being connected together by a third connecting passage;

a first solenoid-operated valve disposed in said first connecting passage for making and blocking a fluid communication between said first chamber and said hydraulic power supply;

a second solenoid-operated valve disposed in said third connecting passage for opening and closing the latter;

a third solenoid-operated valve disposed in said second connecting passage for opening and closing the latter;

a pulse generator connected with said second and third solenoid-operated valves for issuing them a high frequency pulse signal having a pulse repetition period shorter than an on-off response time of each of said second and third solenoid-operated valves, the duty factor of said pulse signal being variable; and a shift-lever actuator device connected with said first and second fluid-pressure differential cylinders respectively through first and second transmission means for receiving mechanical positional outputs of the respective cylinders to select a gear position corresponding to the thus-received mechanical positional outputs.

Since the second and third solenoid-operated valves are driven by a high frequency pulse signal having a pulse repetition period shorter than the on-off response time of the second and third solenoid-operated valves, it is possible to control the valve opening area in the analog manner, thus providing a fine adjustment of inflow and outflow of working fluid of the valves. With this fine flow control, the fluid-pressure differential cylinders are capable of producing accurate mechanical positional outputs which make it possible to effect accurate and smooth shift and select operations of the transmission.

According to a second aspect of the present invention, there is provided an automatic transmission comprising:

a first fluid-pressure differential cylinder for select operation of said automatic transmission;

a second fluid-pressure differential cylinder for shift operation of said automatic transmission;

each of said first and second fluid-pressure differential cylinders including a first chamber and a second chamber having a larger pressure receiving area than said first chamber, said first chamber being connected through a first connecting passage to a hydraulic power supply, said second chamber being connected through a second connecting passage to a tank, said first and second chambers being connected together by a third connecting passage;

a first solenoid-operated valve disposed in said first connecting passage for making and blocking a fluid communication between said first chamber and said hydraulic power supply;

a second solenoid-operated valve disposed in said third connecting passage for opening and closing the latter;

a third solenoid-operated valve disposed in said second connecting passage for opening and closing the latter;

a pulse generator connected with said second and third solenoid-operated valves for issuing them a high frequency pulse signal having a pulse repetition period shorter than the on-off response time of each of said second and third solenoid-operated valves, the duty factor of said pulse signal being variable;

a shift-lever actuator device connected with said first and second fluid-pressure differential cylinders respectively through first and second transmission means for receiving mechanical positional outputs of the respective cylinders to select a gear position corresponding to the thus-received mechanical positional outputs;

a first block containing said first fluid-pressure differential cylinder and having a fluid intake hole and a fluid discharge hole, said intake and discharge holes opening to a face of said first block respectively through a pair of fluid passages defined in said first block;

a second block containing said second fluid-pressure differential cylinder and having a fluid intake hole and a fluid discharge hole; and connecting means for joining said first and second blocks together such that said first and second blocks are contacting facewise with each other with said openings at said face held in communication with said intake and discharge holes in said second block.

The first and second fluid-pressure differential cylinders thus united has only one pair of intake and discharge holes and hence can be connected with a piping system with utmost ease.

According to a third aspect of the present invention, there is provided an automatic transmission comprising:

a first fluid-pressure differential cylinder for select operation of said automatic transmission;

a second fluid-pressure differential cylinder for shift operation of said automatic transmission;

each of said first and second fluid-pressure differential cylinders including a first chamber and a second chamber having a larger pressure receiving area than said first chamber, said first chamber being connected through a first connecting passage to a hydraulic power supply, said second chamber being connected through a second connecting passage to a tank, said first and second chambers being connected together by a third connecting passage;

a first solenoid-operated valve disposed in said first connecting passage for making and blocking a fluid communication between said first chamber and said hydraulic power supply;

a second solenoid-operated valve disposed in said third connecting passage for opening and closing the latter;

a third solenoid-operated valve disposed in said second connecting passage for opening and closing the latter;

a pulse generator connected with said second and third solenoid-operated valves for issuing them a high frequency pulse signal having a pulse repetition period shorter than the on-off response time of each of said second and third solenoid-operated valves, the duty factor of said pulse signal being variable;

a shift-lever actuator device connected with said first and second fluid-pressure differential cylinders respectively through first and second transmission means for receiving mechanical positional outputs of the respective cylinders to select a gear position corresponding to the thus received mechanical positional outputs;

a first block containing said first fluid-pressure differential cylinder and having a fluid intake hole and a fluid discharge hole, said intake and discharge holes opening to a face of said first block respectively through a pair of fluid passages defined in said first block;

a second block containing said second fluid-pressure differential cylinder and having a fluid intake hole and a fluid discharge hole;

connecting means for joining said first and second blocks together such that said first and second blocks are contacting facewise with each other with said openings at said face held in communication with said intake and discharge holes in said second block;

first positioning means for determining a reference position of a piston rod of said first fluid-pressure differential cylinder, said first positioning means including an annular groove defined on a circumferential surface of said piston rod, and a locking member fittingly engageable with said annular groove; and second positioning means for determining a reference position of a piston rod of said second fluid-pressure differential cylinder, said second positioning means including an annular groove defined on a circumferential surface of the last-named piston rod, and a lock member fittingly engageable with the last-named annular groove.

With this construction, when each of the locking members is fitted into a corresponding one of the grooves, a muscle effort is required to displace the piston rod in an axial direction. Thus the reference position of the piston is determined mechanically, thereby enabling an easy adjustment of connection between the piston rod and the shift-lever actuator device.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 4 is a vertical cross-sectional view of the differential cylinder;

FIG. 5 is a left side view, partly in cross section, of the differential cylinder;

FIG. 6 is a right side view, partly in cross section, of the differential cylinder;

DETAILED DESCRIPTION

A preferred embodiment of the present invention will be described below in greater detail with reference to the accompanying drawings.

Figure 1:
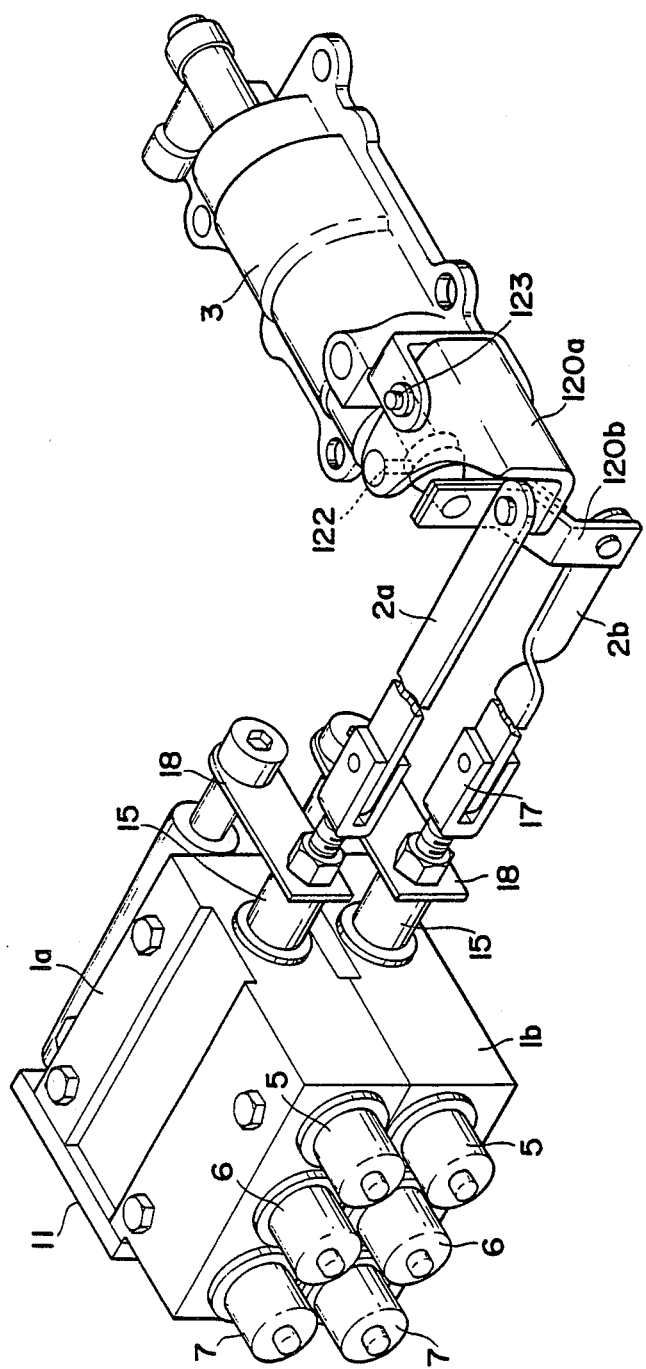
FIG. 1 is a perspective view of an embodiment of the present invention.

FIG. 1 schematically shows part of an automatic transmission embodying the present invention. The automatic transmission comprises a fluid-pressure differential cylinder 1a for select operation of the transmission, a fluid-pressure differential cylinder 1b for shift operation of the transmission, first and second transmission means 2a, 2b for transmitting mechanical positional outputs of the respective differential cylinders 1a, 1b to a shift-lever actuating device 3 which in turn selects a gear position corresponding to the mechanical positional outputs.

As shown in FIGS. 2 through 6 and FIGS. 11 and 12, the fluid-pressure differential cylinders 1a, 1b are identical in construction and each include a cylinder body 4, first to third solenoid-operated valves 5-7, and a position sensor 8.

The cylinder body 4, as shown in FIG. 4, includes a cylinder block 9 having an internal cylinder bore 10 closed at one end thereof by a cover plate 11. A stepped piston 12 is slidably fitted in the cylinder bore 10 to define two chambers 13 and 14 in the cylinder body 4 on opposite sides of the piston 12. The chamber 13 is disposed on a small pressure-receiving area side of the piston 12 while the chamber 14 is disposed on a large pressure-receiving area side of the piston 12.

The piston 12 has a piston rod 15 slidably received in a through-hole 16 in the cylinder block 9 and projecting outwardly therefrom at one end thereof. The projecting end of the piston rod 15 is concentrically threaded to an output connecting rod 17 and supports thereon a connecting lever 18 for connection with the position sensor 8.

The piston rod 15 has n annular groove 20 at a proper position on its circumferential surface. The block 9 has a stepped vertical hole 21 extending perpendicular to the through-hole 16 and opening at one end to the through-hole 16 for receiving therein a locking member 22. The locking member 22 is in the form of a detent mechanism and includes a ball 22a, a compression coil spring 22b and a mounting screw 22c. The mounting screw 22c is threaded into a threaded portion of the stepped bore and has a blind hole extending longitudinally from the distal end of its shank. The ball 22a is slidably retained in the blind hole and urged outwardly to project into the through-hole 16 by means of the spring 22b which is disposed in the blind hole and acts between the ball 22a and the mounting screw 22c. The ball 22a of the lock member 22 thus constructed is snappingly engageable with the annular groove 20 of the piston rod 15 to thereby releasably lock the piston rod 15 aganist axial displacement, thereby making it possible to determine a reference position of the piston 12.

In the illustrated embodiment, the reference position is set at a midpoint of the stroke of the piston 12. With the reference position thus provided, a driven member which is connected to the piston rod 15 via the output connecting rod 17 can easily be set at a midpoint of the stroke thereof, accordingly.

The reference position of the piston 12 can easily be sensed by the operator as the resistance to an axial movement of the piston rod 15 is suddenly changed upon arrival of the piston 12 at the reference position or departure of the piston 12 from the reference position (i.e., upon engagement and disengagement of the locking member 22 with the annular groove 20) when the piston rod 15 is axially displaced while the solenoid-operated valves 5-7 are kept de-energized. The resistance is negligible when the piston 12 is displaced by the force of the pressurized working fluid.

The position sensor 8 is so constructed as to detect a displacement or a positional change of the piston rod 15 as a change of electric resistance. The position sensor 8 is disposed below the cylinder body 4 and supported by the cover plate 11 and a support bracket 24 depending from the cylinder block 9. The position sensor 8 has a sensor rod 23 projecting outwardly from the body of the position sensor 8 and connected at an outer end to the connecting lever 18 secured to the piston rod 15.

Four connecting holes 25 extend through the block 9 from a front face to a rear face of the block 9 and disposed adjacent to four corners of the block 9 for receiving respectively therein connecting bolts 26 (FIGS. 11 and 12) when the differential cylinders 1a, 1b are joined together as described later on.

Figure 7:
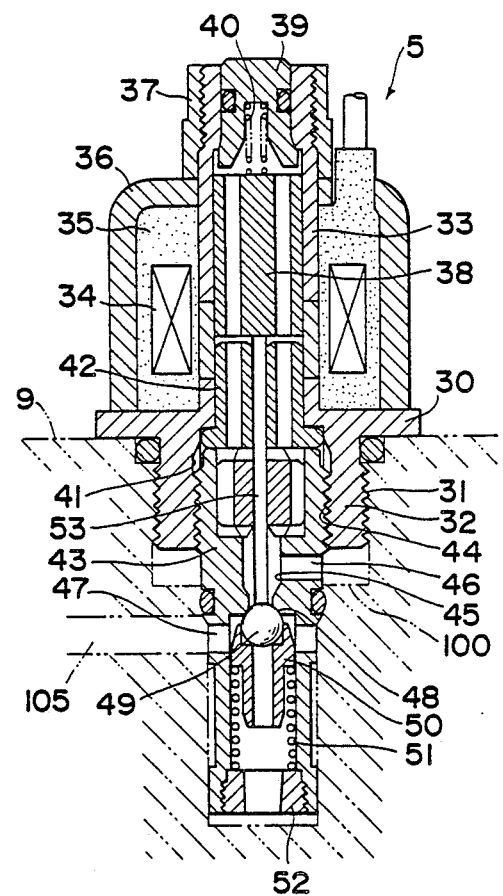
FIG. 7 is a cross-sectional view of a first solenoid-operated valve.

The first solenoid-operated valve 5, as shown in greater detail in FIG. 7, includes a body 30 having a downwardly extending tubular mounting portion 32 and a plunger guide tube 33 disposed concentrically above the mounting portion 32, the mounting portion 32 being externally threaded as at 31. A cylindrical excitation coil 34 is disposed around the plunger guide tube 33 and held in position against displacement by a molded synthetic resin 35 covered by a case 36.

The case 36 is secured to the valve body 30 by means of a nut 37 threaded to an upper end of the plunger guide tube 33. The plunger guide tube 33 movably receives therein a plunger 38 which is normally urged axially downwardly by a compression coil spring 40 disposed between an upper end of the plunger 38 and an end cap 39 fitted into the upper end of the plunger guide tube 33.

The tubular mounting portion 32 of the body 30 is also internally threaded as at 41 and guidedly receives therein a rod guide member 42. The rod guide, member 42 is firmly retained in the mounting portion 32 by a valve seat member 43 threaded into the internally threaded hole 41 of the tubular mounting portion 32.

The valve seat member 43 has an externally threaded upper portion 44 tightly fastened to the mounting portion 32, a central axial hole 45 extending longitudinally therethrough, a radial inlet port 46 disposed adjacent to the externally threaded upper portion 44 and communicating with the axial hole 45, and a radial outlet port 47 disposed below the inlet port 46 and communicating with the axial hole 45. The axial hole 45 is stepped at a portion between the inlet port 46 and the outlet port 47 so as to form a downwardly facing valve seat 48.

A valve element 49 comprising a ball valve is held in a valve retainer 50 and urged into contact with the valve seat 48 by means of a compression coil spring 51 acting between the valve retainer 50 and a spring retainer threaded to a lower portion of the valve seat member 43.

The valve element 49 is held in contact with one end of a push rod 53 connected at the other end to the plunger 38 so that when the excitation coil 34 is de-energized, the valve element 49 is held in contact with the valve seat 48 under the force of the spring 51, thereby closing the solenoid-operated valve 5.

As shown in FIGS. 2-6, the first solenoid-operated valve 5 of the foregoing construction is mounted on the cylinder block 9 by threading the mounting portion 32 into an internally threaded mounting hole 100 in the cylinder block 9. In this mounted condition, the inlet port 46 of the valve seat member 43 opens at its one end to a lower portion of the mounting hole 100. The mounting hole 100 is connected to an intake hole 104 through a fluid passage 103 formed in the body 4 and hence the inlet port 46 of the first solenoid-operated valve 5 is held in fluid communication with the intake hole 104.

On the other hand, the outlet port 47 of the first solenoid-operated valve 5 is connected through a fluid passage 105 in the cylinder block 9 with the small pressure-receiving area side chamber 13 in the cylinder body 4.

Figure 8:
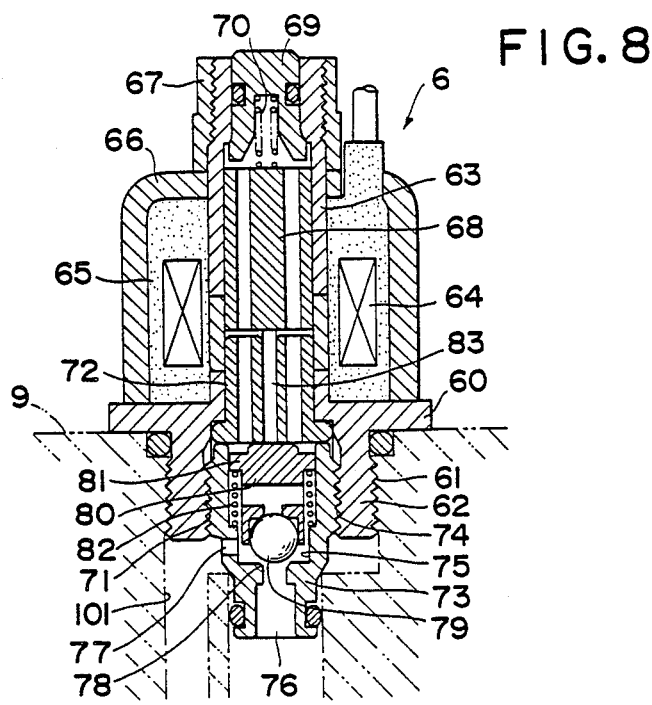
FIG. 8 is a cross-sectional view of a second solenoid-operated valve.

The second solenoid-operated valve 6 is shown in greater detail in FIG. 8, in which a body 60 of the valve 6 includes a downwardly projecting tubular mounting portion 62 threaded externally as at 61, and a plunger guide tube 63 disposed concentrically above the tubular mounting portion 60. A cylindrical excitation coil 64 is disposed around the plunger guide tube 63 and firmly retained in position against displacement by being embedded in a molded synthetic resin 65 covered by a case 66.

The case 66 is secured to the valve body 60 by means of a nut 67 threaded over an externally threaded upper end of the plunger guide tube 63. The plunger guide tube 63 movably receives therein a plunger 68 which is normally urged axially downwardly under the force of a compression coil spring 70 disposed between an upper end of the plunger 68 and an end cap 69 fitted in the upper end of the plunger guide tube 63.

The mounting portion 62 of the body 60 is also internally threaded as at 71 and guidedly receives therein a rod guide member 72. The rod guide member 72 is firmly retained in the mounting protion 62 by means of a valve seat member 73 threaded into the internally threaded hole 71 in the tubular mounting portion 62.

The valve seat member 73 has an extenally threaded upper portion 74 fastened to the mounting portion 62, and an axial hole 75 extending longitudinally through the valve seat member 73, the lower end of the axial hole 75 constituting the only inlet port 76. The valve seat member 73 also has a radial outlet port 77 disposed upwardly of the inlet port 76, and an upwardly facing annular valve seat 78 disposed between the inlet port 76 and the outlet port 77.

A valve element 73 is in the from of a ball valve and held in a valve retainer 80 movably received in the axial hole 75 in the valve seat member 73. A compression coil spring 82 acts between, the valve seat member 73 and an upper flange 81 of the valve retainer 80 to urge the valve retainer 80 upwardly. The valve element 79 is thus normally held out of contact with the valve seat 78 under the force of the spring 82. The valve retainer 80 is held in contact with a lower end of a push rod 83 which in turn is connected at its upper end to the plunger 68. With this construction, when the excitation coil 64 is de-energized, the valve element 79 is held out of contact with the valve seat 78 under the force of the spring 82. The second solenoid-operated valve 6 therefore normally stands opened.

Figure 2:
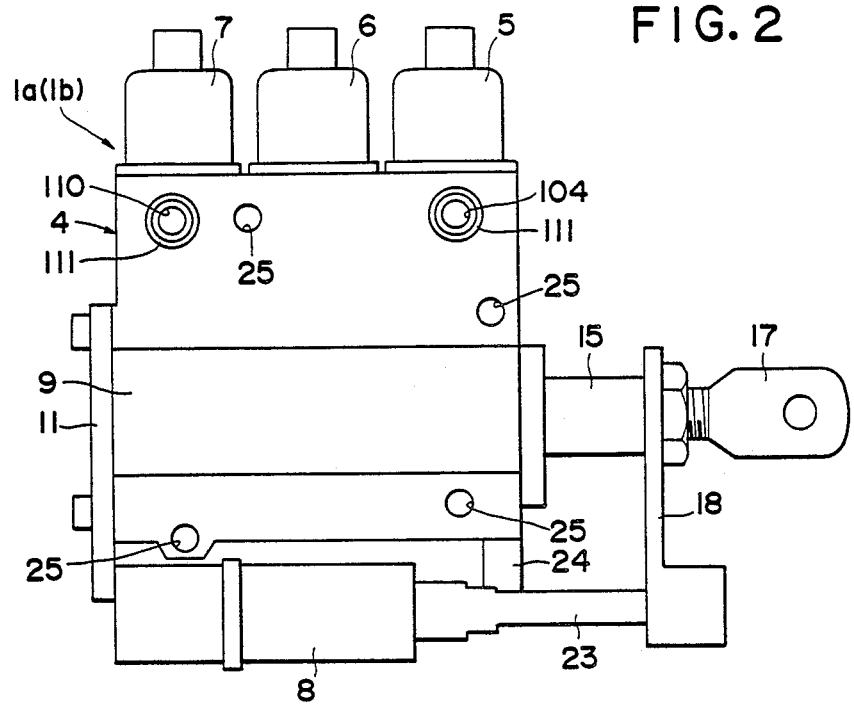
FIG. 2 is a front elevational view of a fluid-pressure differential cylinder.
Figure 3:
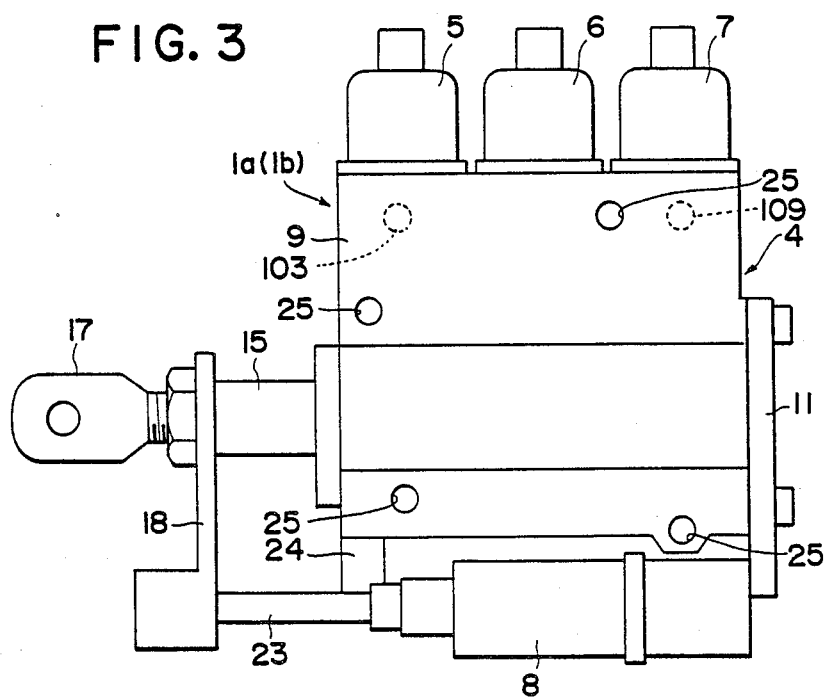
FIG. 3 is a rear view of FIG. 2.

The second solenoid-operated valve 6 of the foregoing construction is mounted on the cylinder block 9, as shown in FIGS. 2 and 6, in which the mounting portion 62 of the valve 6 is threaded into an internally threaded mounting hole 101 in the cylinder block 9. In this mounted condition, the inlet port 76 is communicated with the fluid passage 105 through a fluid passage 106 while the outlet port 77 is opening to a lower portion of the mounting hole 101 and connected through a fluid passage 107 to the large pressure-receiving area side chamber 12 in the cylinder body 4.

Figure 9:
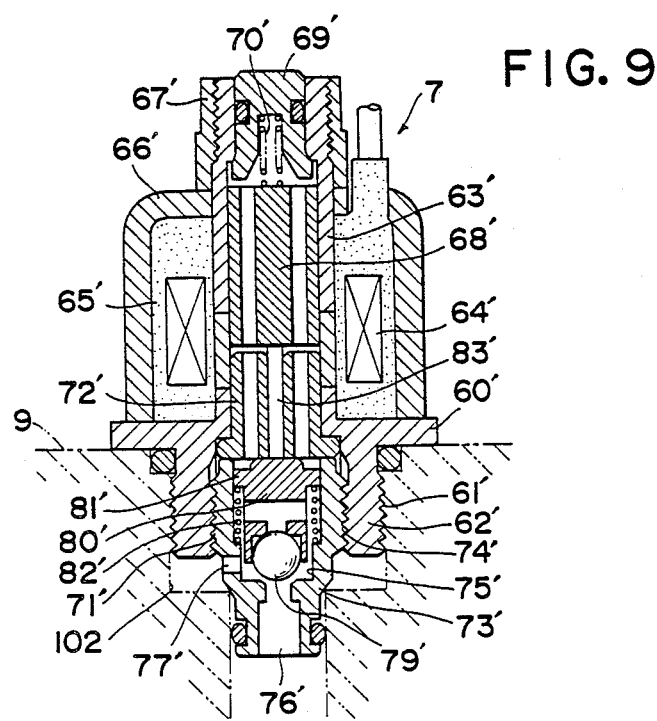
FIG. 9 is a cross-sectional view of a third solenoid-operated valve.

As shown in FIG. 9, the third solenoid-operated valve 7 is identical in structure to the second solenoid-operated valve 6 described above and hence no description is necessary. In this identical structure, corresponding parts are designated by the same reference numerals with a prime affixed thereto. The third solenoid-operated valve 7 is mounted on the cylinder block 9 by threading the mounting portion 62' into a mounting hole 102 in the cylinder block 9. An inlet port 76' in a valve seat member 73' communicates with the fluid passage 107 through a fluid passage 108 while an outlet port 77' is open to a lower portion of the mounting hole 102 and connected through a fluid passage 109 to a discharge hole 110.

Figure 10:
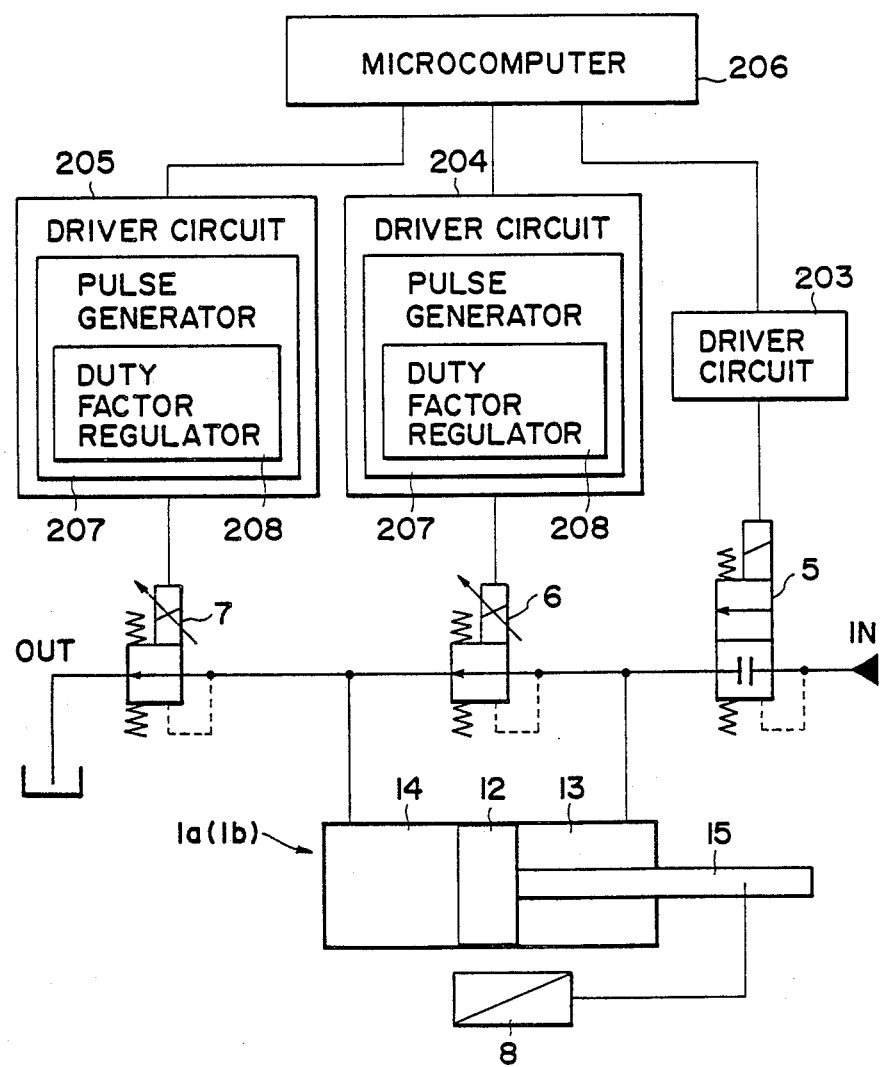
FIG. 10 is a combined electric and hydraulic circuit diagram.

FIG. 10 shows a control circuit for the differential cylinder actuator 1a or 1b described above. The small pressure-receiving area side chamber, 13 is connected successively through the fluid passages 105, 103 and the first solenoid-operated valve 5 disposed therein to a hydraulic power supply (not shown). On the other hand, the large pressure-receiving area side chamber 14 is connected through the fluid passage 108, 109 and the third solenoid-operated valve 7 disposed therein to a tank. Both chambers 13, 15 are connected together through the fluid passages 106, 107 and the second solenoid-operated valve 6 disposed therein.

The first to third solenoid-operated valves 5-7 receive pulse signals issued respectively from driver circuits 203-205 for controlling an inflow and an outflow of working fluid in both chamber 13 and 14 of the differential cylinder 1a or 1b. The inflow and outflow of working fluid are converted into mechanical forces which are finally outputted to an external device via the piston rod 15.

The first solenoid-operated valve 5 is merely controlled in an on-off mode as in the case of a two-position directional control valve. When the driver circuit 203 issues an exciting current to energize the coil 34, the valve 5 is turned on or opened. The valve 5 is kept closed while the coil 34 is de-energized.

To the second solenoid-operated valve 6, the driver circuit 204 supplies a pulse signal of a high frequency such as 500 Hz such that the pulse repetition period of the pulse signal is smaller than the on-off response time of the valve element 79. The duty factor (pulse width-/pulse repetition period) of the pulse signal is regulated to achieve an analog proportional control of the open area of the valve 6. Stated more specifically, the greater the duty factor, the smaller the valve open area. When the duty factor comes to a maximum value, the valve 6 is fully closed. Conversely, the valve open area increases with a decrease in duty factor. When the duty factor is lowered to a minimum value, the valve 6 is fully opened, thereby allowing a maximum flow of the working fluid.

The driver circuit 204 is composed of a pulse generator 207 capable of producing a high frequency pulse signal and including a duty factor regulator 208. Operation of the drive circuit 204 is controlled according to a suitable program stored in the microcomputer 206.

The third solenoid-operated valve 7, like the second solenoid-operated valve 6 described above, receives a high frequency (e.g. 500 Hz) pulse signal delivered from the driver circuit 205. The duty factor of the high frequency pulse signal is regulated to achieve an analog proportional control of the open area of the valve 7.

In order to control the output of the differential cylinder 1a or 1b, the microcomputer 206 sends control demand signals to the respective driver circuits 203, 204, 205 which in turn issue predetermined pulse signals to the corresponding solenoid-operated valves 5–7 whereupon the solenoid-operated valves 5–7 are operated to vary the inflow and outflow of the differential cylinder 1a or 1b, thereby varying the mechanical output of the cylinders 1a, 1b.

Figure 15:
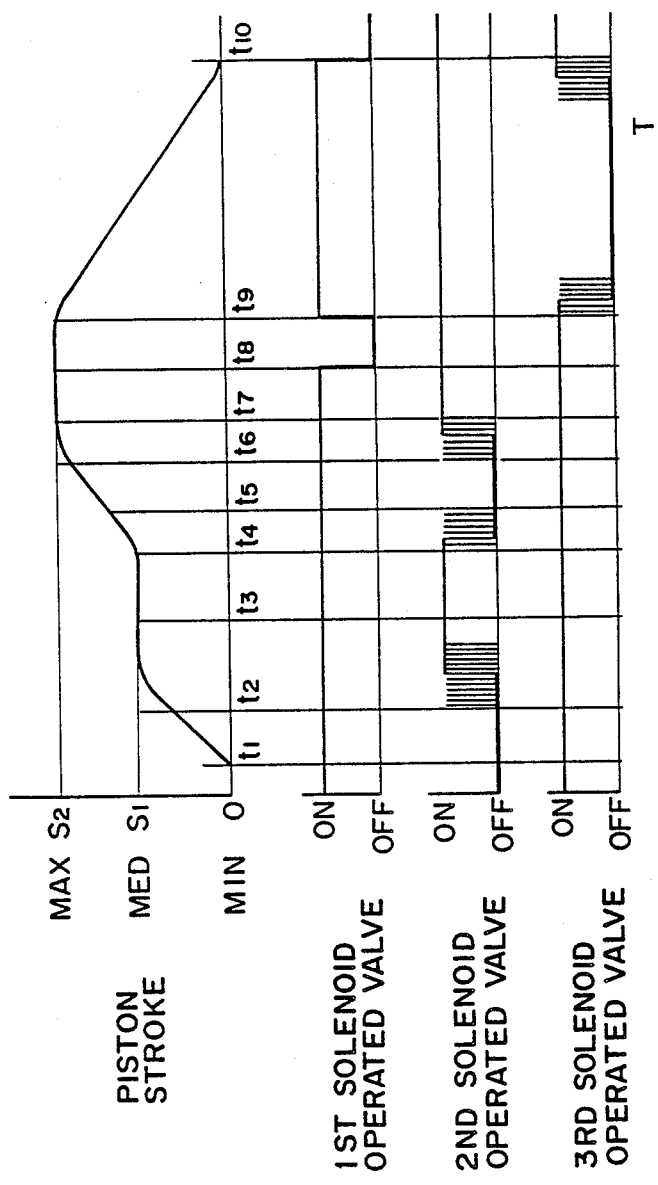
FIG. 15 is a diagram illustrative of the manner in which the first to third solenoid-operated valves are controlled to perform a predetermined piston stroke of the differential cylinder.

An exemplary operation mode of the differential cylinders, 1a, 1b will be described below with reference to FIGS. 10 and 15. The first solenoid-operated valve 5 is energized to open. At the same time, an exciting current is issued to the third solenoid-operated valve 7 to fully close the same. The second solenoid-operated valve 6 is kept de-energized and hence is fully opened. Thus, a working fluid is allowed to concurrently flow into both the small pressure-receiving area side chamber 13 and the large pressure-receiving area side chamber 15 of the differential cylinder 1a, 1b. Due to a pressure difference generated between the two chambers 13, 14, the piston 12 is caused to start moving rightwards at a point t1 shown in FIG. 15. At a point t2, the driver circuit 204 begins to issue a high frequency pulse signal to the second solenoid-operated valve 6 for temporarily stopping the rightward movement of the piston 12 when the piston 12 arrives at a midpoint S1 of its stroke. The pulse signal is applied such that the duty factor of the pulse signal is initially small, then gradually increased as the time goes on, and finally becomes maximum at the time just before a point t3 shown in FIG. 15. This means that the open area of the second solenoid-operated valve 6 varies in the analog manner to increase gradually from the maximum (the valve full open position) to the minimum (the valve full close position) in which an inflow of working fluid to the large pressure receiving area side chamber 15 is blocked. The piston 12 is thus stopped ar the predetermined position S1. When a predetermined period of time extending between points t3 and t4 has lapsed, the duty factor of the pulse signal on the second solenoid-operated valve 6 is decreased gradually to thereby increase the valve open area from zero to the maximum. The piston 10 again moves rightwards. This condition is maintained for the period ranging from a point t5 a point t6 at which the piston 10 reaches to a position near a final target position S2. In this instance, the pulse duty factor is again increased to thereby reduce the valve open area proportionally. At a point t7, the valve 6 is fully closed whereupon the forward stroke of the piston 12 is completed and the piston 12 is thus stopped at the final target position S2.

The movement of the piston 12 of the differential cylinder actuator 1a, 1b is controlled by a feed back signal issued from the position sensor 8 such that the pulse duty factor is increased as the piston 12 approaches the intermediate position S1 and the final target position S2, thereby preventing the piston 12 from overrunning beyond the positions S1, S2.

When the piston 12 is to be returned from the final target position, the first solenoid-operated valve 5 is energized to open at a point t9. Simultaneously therewith, a pulse signal having a large pulse duty factor is supplied to the second solenoid-operated valve 6 at a large duty factor to keep the closed condition of the valve 6. Conversely, the third solenoid-operated valve 7 receives a pulse signal having a small duty factor with the result that the working fluid is expelled from the large pressure-receiving area side chamber 14, thereby moving the piston leftwards. The return speed of the piston 12 can be controlled by regulating the duty factor of the high frequency pulse issued to the third solenoid-operated valve 7. This pulse duty factor is set at a maximum value when the return stroke of the piston 12 is terminated.

Figure 11:
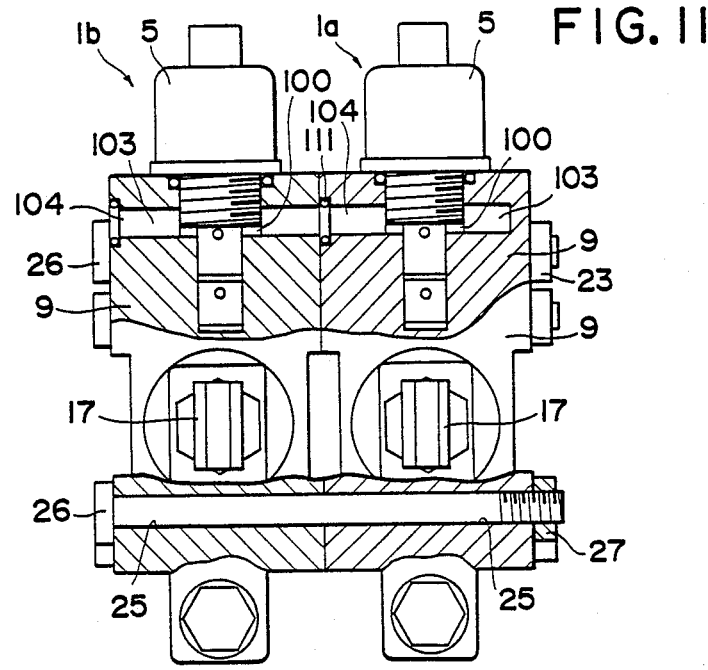
FIG. 11 is a left side view, partly in cross section, of two fluid-pressure differential cylinders joined together.
Figure 12:
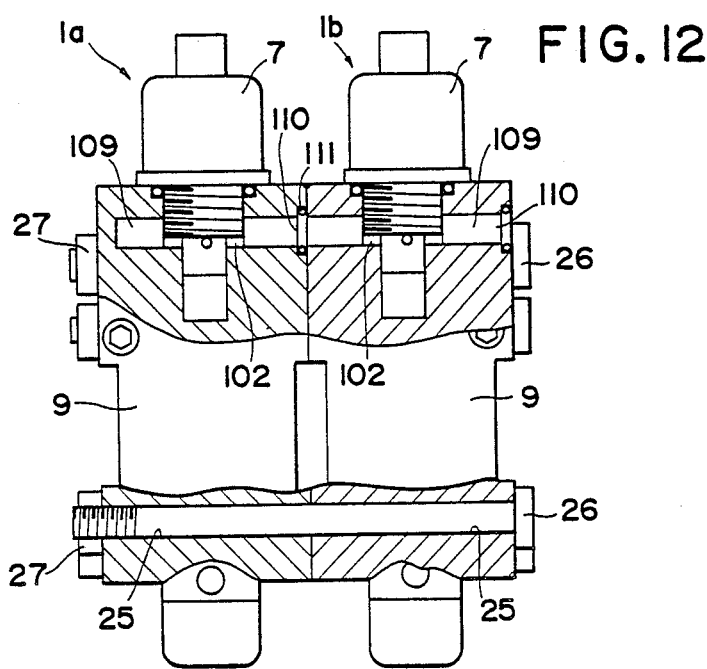
FIG. 12 is a right side view, partly in cross section, of the differential cylinders shown in FIG. 11.

The fluid-pressure differential cylinders 1a, 1b are joined together as shown in FIGS. 11 and 12. In assembly, the cylinder blocks 9 of the differential cylinders 1a, 1b are brought into facewise contact with each other. Then the connecting bolts 26 are inserted through the connecting holes 25, respectively, and thereafter four nuts 27 are threaded tightly to the respective bolts 26 to join the differential cylinders 1a, 1b. Prior to this assembly, one of the cylinder blocks 9 is finished or processed by boring or drilling such that the flow passages 103, 109 extend transversely across the cylinder block 9 and open at opposite ends thereof to front and back faces of the cylinder block 9. Accordingly, the flow passages 103, 109 in the thus-bored one cylinder block 9 communicate respectively with the flow passages 103, 109 in the other cylinder block 9 when the two blocks 9 are joined facewise with each other. A plurality of seals 111 are provided between contacting surfaces of the cylinder blocks 9 in the vicinity of the flow passages 103, 109 to prevent the leakage of working fluid.

The differential cylinders 1a, 1b thus joined have only one pair of intake and discharge holes 104, 110 and hence can be connected to a piping with utmost ease.

The transmission means 2a, 2b comprise a pair of elongate plate-like levers, each lever 2a and, 2b being connected at one of its opposite ends to the output connecting rod 17 of the piston rod 15 of the corresponding differential cylinder 1a, 1b, the opposite end of the respective levers 2a, 2b being connected to corresponding levers 102a, 102b of the shift-lever actuator device 3.

Figure 13:
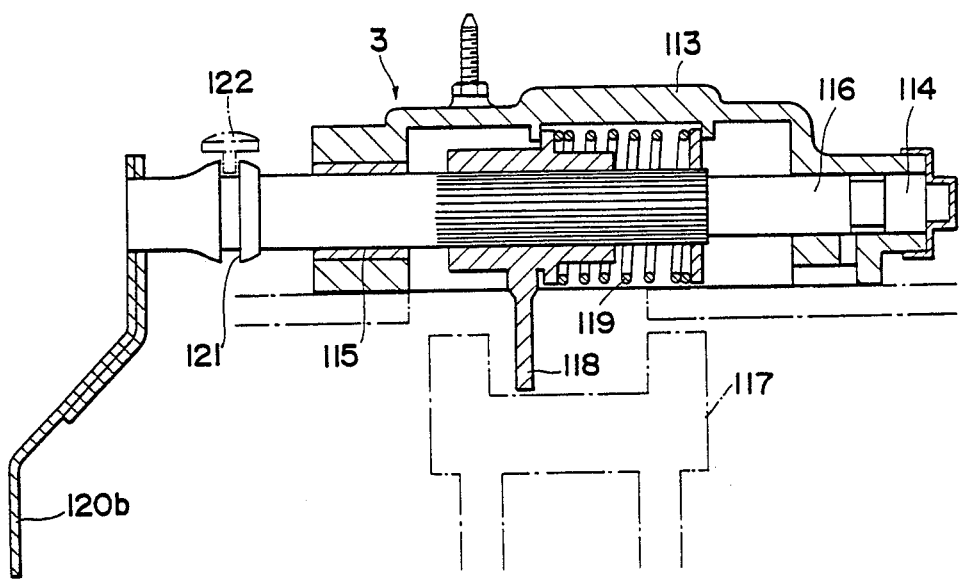
FIG. 13 is a cross-sectional view of a shift lever actuator device.

The shift-lever actuator device 3, as shown FIGS. 1 and 13, is disposed on a transmission (indicated by phantom lines in FIG. 13) and includes a downwardly open cover 113 and a drive shaft 116 disposed in the cover 113 and rotatably supported by a pair of aligned bores 114, 115 defined at opposite end portions of the cover 113. The drive shaft 116 fixedly supports thereon a gearshift lever 118 engageable with a gearshift fork 117 of the transmission. A compression coil spring 119 acts between the cover 113 and the gearshift lever 118 to urge the drive shaft 116 leftwards in FIG. 13.

One end portion of the drive shaft 116 projects outwardly from the cover 113 and is connected to the lever 120b which in turn is connected to the transmission means or lever 2b. The lever 120b takes part in the shift operation of the transmission. The end portion also has a circumferential groove 121 in which a pin 122 of the lever 120a is engaged. The lever 120a takes part in the select operation of the transmission. The lever 120a is generally L-shaped as shown in FIG, 1, and is pivoted at its intermediate portion to the cover 113 by means of a shaft 123. The L-shaped lever 120a is pivotably connected to the transmission lever 2a and is provided with the pin 122 held in engagement with the groove 121 in the drive shaft 116. With this arrangement, when the lever 120a is driven by the transmission lever 2a to turn about the shaft 123, interaction between the pin 122 and the groove 121 causes the drive shaft 116 to be displaced longitudinally to such an extent that the gearshift lever 118 is movable between positions N1, N2 and N3.

When the lever 120b is moved by the transmission lever 2b, the drive shaft 116 is driven to rotate about its own axis to thereby select a desired gearshift position.

In operation, the mechanical positional outputs of the respective differential cylinders 1a, 1b are delivered from the piston rods 15 through the transmission levers 2a, 2b to the shift-lever actuator device 3 for shifting a gear train to a desired position.

Figure 14:
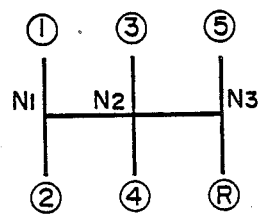
FIG. 14 a view illustrative of a shift pattern in accordance with which the shift-lever actuator device operates.

For example, when starting an automotive vehicle, the gearshift lever 118 is to be moved from the current position N1 to the first gear position indicated by circled numeral 1 in FIG. 14 In this instance, the fluid-pressure differential cylinder 1a for actuating the lever 120 for achieving select .operation of the transmission is de-activated while the lever 120b is turned by the mechanical output of the fluid-pressure differential cylinder 1b in a direction to move the gearshift lever 118 to the first gear position. As the vehicle travelling speed increases, the second gear position indicated by circled numeral 2 is to be selected. At this time, the shift lever 118 is moved from the first gear position through the position N1 to the second gear position by the output of the differential cylinder 1b. A further increase in vehicle travelling speed makes it necessary to select the third gear position indicated by circled numeral 3 in which instance the gearshift lever 118 is returned to the position N1 by the output of the differential cylinder 1b, then the differential cylinder 1a is activated to move the gearshift lever 118 to a position N2, and thereafter the differential cylinder 1b is activated again to displace the gearshift lever 118 to the third gear position. Thus the gearshift lever 118 is placed accurately and smoothly in a desired one of the gear positions under the control of the differential cylinders 1a, 1b.

Obviously, many modifications and variations of the present invention are possible in the light of the above teaching. It is therefore to be understood that within the scope of the appended claims, the invention may be practiced otherwise than as specifically described.

What is claimed is:

1. An automatic transmission comprising:
(a) a first fluid-pressure differential cylinder for select operation of said automatic transmission;
(b) a second fluid-pressure differential cylinder for shift operation of said automatic transmission;
(c) each of said first and second fluid-pressure differential cylinders including a first chamber and a second chamber having a larger pressure receiving area than said first chamber, said first chamber being connected through a first connecting passage to a hydraulic power supply, said second chamber being connected through a second connecting passage to a tank, said first and second chambers being connected together by a third connecting passage;
(d) a first solenoid-operated valve disposed in said first connecting passage for making and blocking a fluid communication between said first chamber and said hydraulic power supply;
(e) a second solenoid-operated valve disposed in said third connecting passage for opening and closing said third connecting passage;
(f) a third solenoid-operated valve disposed in said second connecting passage for opening and closing said third connecting passage;
(g) a pulse generator connected with said second and third solenoid-operated valves for issuing them a high frequency pulse signal having a pulse repetition period shorter than an on-off response time of each of said second and third solenoid-operated valves, said pulse signal having a duty factor which is variable;
(h) a shift-lever actuator device connected with said first and second fluid-pressure differential cylinders respectively through first and second transmission means for receiving mechanical positional outputs of the respective cylinders to select a gear position corresponding to the thus-receiving mechanical positional outputs;
(i) a first block containing said first fluid-pressure differential cylinder and having a fluid intake hole and a fluid discharge hole, said intake and discharge holes opening to a face of said first block respectively through a pair of fluid passages defined in said first block;
(j) a second block containing and said second fluid-pressure differential cylinder and having a fluid intake hole and a fluid discharge hole; and
(k) connecting means for joining said first and second blocks together such that said first and second blocks are in facewise contact with each other with said openings at said face held in communication with said intake and discharge holes in said second block.

2. An automatic transmission comprising:
(a) a first fluid-pressure differential cylinder for select operation of said automatic transmission;
(b) a second fluid-pressure differential cylinder for shift operation of said automatic transmission;
(c) each of said first and second fluid-pressure differential cylinders including a first chamber and a second chamber having a larger pressure receiving area than said first chamber, said first chamber being connected through a first connecting passage to a hydraulic power supply, said second chamber being connected through a second connecting passage to a tank, said first and second chambers being connected together by a third connecting passage;
(d) a first solenoid-operated valve disposed in said first connecting passage for making and blocking a fluid communication between said first chamber and said hydraulic power supply;

(e) a second solenoid-operated valve disposed in said third connecting passage for opening and closing said third connecting passage;

(f) a third solenoid-operated valve disposed in said second connecting passage for opening and closing said second connecting passage;

(g) a pulse generator connected with said second and third solenoid-operated valves for issuing them a high frequency pulse signal having a pulse repetition period shorter than an on-off response time of each of said second and third solenoid-operated valves, said pulse signal having a duty factor which is variable;

(h) a shift-lever actuator device connected with said first and second fluid-pressure differential cylinders respectively through first and second transmission means for receiving mechanical positional output of the respective cylinders to select a gear position corresponding to the thus-receiving mechanical positional outputs;

(i) a first block containing said first fluid-pressure differential cylinder and having a fluid intake hole and a fluid discharge hole, said intake and discharge holes opening to a face of said first block respectively through a pair of fluid passages defined in said first block;

(j) a second block containing said second fluid-pressure differential cylinder and having a fluid intake hole and a fluid discharge hole;

(k) connecting means for joining said first and second blocks together such that said first and second blocks are in facewise contact with each other with said openings at said face held in communication with said intake and discharge holes in said second block;

(l) first positioning means for determining a reference position of a piston rod of said first fluid-pressure differential cylinder, said first positioning means including an annular groove defined on a circumferential surface of said piston rod, and a locking member fittingly engageable with said annular groove; and (m) second positioning means for determining a reference position of a piston rod of said second fluid-pressure differential cylinder, said second positioning means including an annular groove defined on a circumferential surface of the last-named piston rod, and a lock member fittingly engageable with the last-named annular groove.

3. An automatic transmission according to claim 2, each of said locking member including a spring disposed in a hole defined in each said block and extending perpendicular to the axis of a through-hole in which said piston rod is slidably received, and a ball urged by said spring to project into said through-hole.

* * * * *

UNITED STATES PATENT AND TRADEMARK OFFICE
CERTIFICATE OF CORRECTION

PATENT NO. : 4,896,553

DATED : January 30, 1990

INVENTOR(S) : SATO et al.

It is certified that error appears in the above-identified patent and that said Letters Patent is hereby corrected as shown below:

Column 12, line 23, for "third" read --second--.

Signed and Sealed this

Seventeenth Day of September, 1991

Attest:

HARRY F. MANBECK, JR.

*Attesting Officer*    *Commissioner of Patents and Trademarks*